(12) United States Patent
Wang et al.

(10) Patent No.: US 6,785,374 B2
(45) Date of Patent: Aug. 31, 2004

(54) METHOD AND APPARATUS FOR PROVIDING TRANSACTION CAPABILITIES APPLICATION PART INFORMATION IN A SESSION INITIATION PROTOCOL SYSTEM

(76) Inventors: Guanglu Wang, 43 Canterbury La., Buffalo Grove, IL (US) 60089; Michael Homeier, 273 Forest Ave., Elmhurst, IL (US) 60126; Anoop Tripathi, 462 Pheasant Rd., Lake Zurich, IL (US) 60047; David Grabelsky, 3800 Lee St., Skokie, IL (US) 60076

( * ) Notice: Subject to any disclaimer, the term of this patent is extended or adjusted under 35 U.S.C. 154(b) by 93 days.

(21) Appl. No.: 10/260,841

(22) Filed: Sep. 30, 2002

(65) Prior Publication Data

US 2004/0062375 A1 Apr. 1, 2004

(51) Int. Cl.[7] ................................................ H04M 7/00
(52) U.S. Cl. ................................................ 379/219
(58) Field of Search ........................ 379/219, 220.01, 379/221.08, 221.09, 221.12, 221.13, 229

(56) References Cited

U.S. PATENT DOCUMENTS 6,421,674 B1 * 7/2002 Yoakum et al. ................ 707/10
6,647,113 B2 * 11/2003 McCann et al. ........ 379/221.13
6,662,017 B2 * 12/2003 McCann et al. ............ 455/461

* cited by examiner

Primary Examiner—Creighton Smith
(74) Attorney, Agent, or Firm—Fitch, Even, Tabin & Flannery

(57) ABSTRACT

Transaction Capabilities Application Part (TCAP) information from an Signaling System 7 (SS7) network (11) is provided, in response to an original SIP-compatible request by an SIP entity (17) in an SIP network (10), to the SIP network where the TCAP information is then used to facilitate call setup and routing of the call. In one embodiment, the SIP network locally stores the TCAP information upon receipt (at least temporarily) such that the TCAP information is available for subsequent local use without requiring a correspond inquiry to the SS7 network.

35 Claims, 4 Drawing Sheets

METHOD AND APPARATUS FOR PROVIDING TRANSACTION CAPABILITIES APPLICATION PART INFORMATION IN A SESSION INITIATION PROTOCOL SYSTEM

TECHNICAL FIELD

This invention relates generally to communications networks that support internal use of session initiation protocol (SIP).

BACKGROUND

Various kinds of communications networks are known. Many traditional switch-based communications networks (such as many Public Switched Telephone Networks (PSTN)) utilize signaling system 7 (SS7) signaling protocol to effect their own internal messaging needs including the exchange of transaction capabilities application part (TCAP) information. TCAP information comprises a variety of value-added information items that are typically stored in a database and that relate to general or specific functionality of the network (including, for example, information to effect routing services and functionality such as toll-free calling, call-forwarding, local number portability, and so forth). Other networks, however, and particularly more modern networks that comprise a so-called soft switch, rely upon other internal signaling protocols such as, for example, SIP.

Protocols such as SS7 and SIP are not inherently compatible with one another. As a result, an SS7 network cannot directly communicate with an SIP network. Such network-to-network communications, however, are often nevertheless necessary. Such need arises in part due to the substantial legacy base of installed SS7 networks. Although SIP-based soft switch networks offer numerous advantages over more traditional SS7 networks, in many cases a newer SIP-compatible network is simply added into a communications fabric that already includes one or more SS7 networks.

Signaling gateways, such as SS7/SIP signaling gateways, exist to facilitate the intercoupling of such incompatible systems. To a large extent such signaling gateways are a useful and successful tool and permit, for example, the establishment and maintenance of a call that originates in a first network (such as an SIP network) and terminates in or otherwise passes through a second network (such as an SS7 network). Unfortunately, there are many transactions, including various kind of calls, that the simple connectivity offered by a signaling gateway does not sufficiently address. For example, an originating call in an SIP-based network that requires TCAP information as resides within a linked SS7 PSTN-based network presently does not have the benefit of ready access to such TCAP information notwithstanding the existence of a link between the two networks as effected via the signaling gateway. Without such information, call setup may be delayed or even ultimately frustrated.

BRIEF DESCRIPTION OF THE DRAWINGS

The above needs are at least partially met through provision of a method and apparatus for providing transaction capabilities application part information in a session initiation protocol system described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, an SIP-compatible message that includes a request for TCAP information is sourced from within an SIP-compatible network. This request is then forwarded via an SS7-compatible message to an SS7 network having an information repository containing information potentially responsive to the TCAP inquiry. Depending upon the embodiment, the SIP-compatible message that includes the request for TCAP information can be sourced by any number of SIP-compatible devices, including but not limited to user agents (both server and client types), proxy servers, and redirect servers. In a preferred embodiment, an SIP message such as INVITE includes the TCAP request.

Also in a preferred embodiment, the TCAP information when received by the SIP network is locally stored for at least some period of time (for example, at a directory server). That stored TCAP information is then used to respond to subsequent internal SIP network requests for such information, thereby avoiding the need to again query the SS7 network. The storage duration can be varied as appropriate to a given application.

Figure 1:
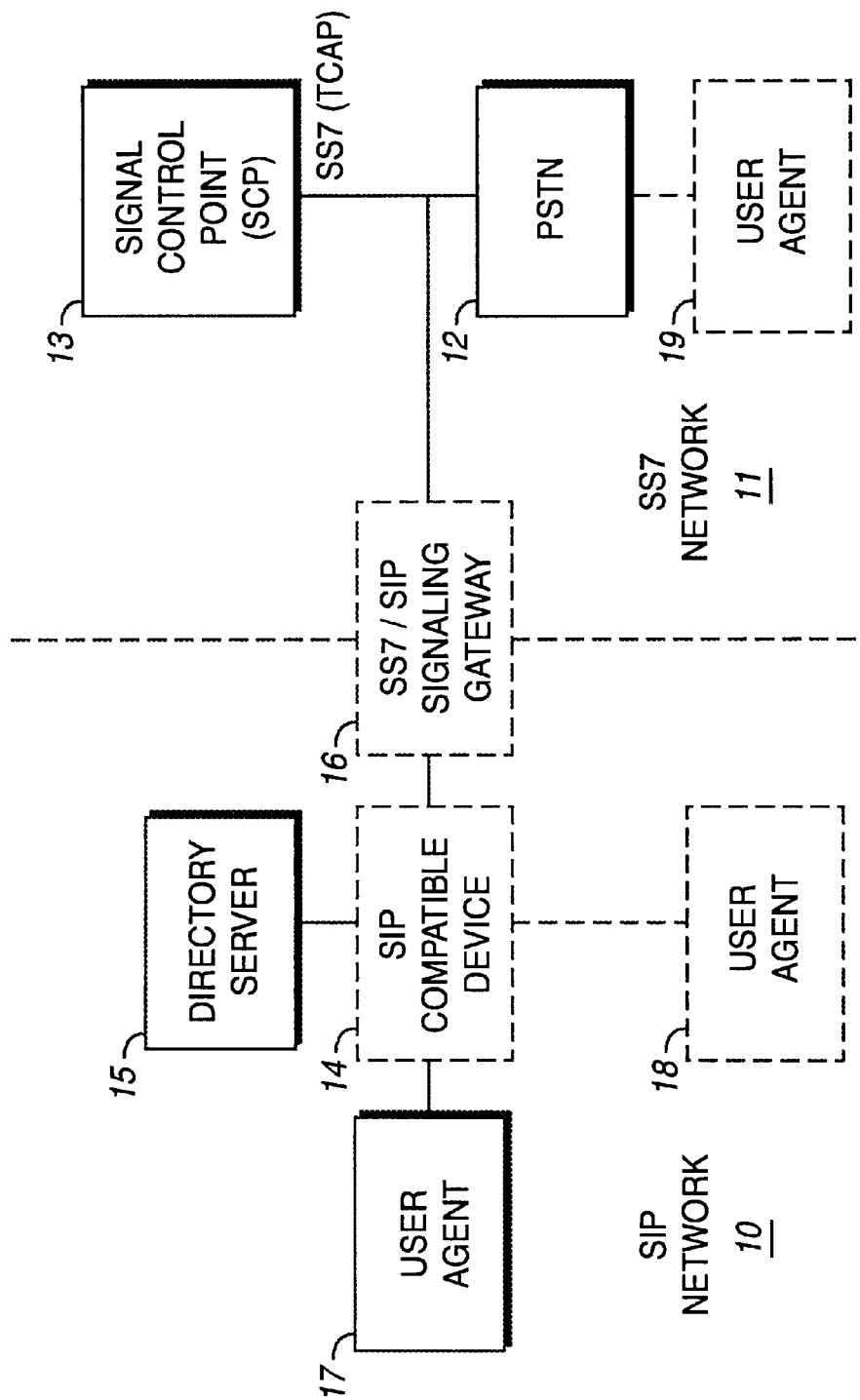
FIG. 1 comprises a block diagram as configured in accordance with an embodiment of the invention.

Referring now to the drawings, and in particular to FIG. 1, an SIP network 10 couples to an SS7 network 11 as described below in more detail. The SS7 network 11 comprises a relatively typical PSTN-based legacy system having at least one PSTN 12 and a corresponding Signal Control Point (SCP) 13 that serves to retain much (or all) of the TCAP kinds of information for the SS7 network 11 as well understood in the art. So configured, the SS7 network 11 can support communications sourced by or delivered to one or more user agents 19 (such as a standard telephone or the like). In general, many or most internal communications that pertain to system functionality, such as TCAP information, are facilitated through use of SS7 as well understood in the art.

The SIP network 10 includes one or more SIP-compatible devices 14 such as, for example, a user agent server, a user agent client, a proxy server, or a redirect server, to name a few. For illustration purposes only, the examples presented below presume that this SIP-compatible device 14 comprises a proxy server. In this embodiment the SIP-compatible device 14 operably couples to a directory server 15 and an SS7/SIP signaling gateway 16. The former serves to store information that the SIP-compatible device 14 can use to effect various communications and the latter serves to facilitate the forwarding of a call from one network (such as the SIP network 10) to the other network (such as the SS7 network 11). So configured, the SIP network 10 can support communications as between an in-system user agent device 17 and other in-system user agents 18 or user agents from other systems (such as a user agent 19 serviced by the SS7 network 11). In general, the above configuration is known and understood in the art.

In a preferred embodiment, however, the SIP-compatible device 14 has some additional useful modes of operation. For example, pursuant to one mode of operation, the SIP-compatible device 14 can transmit an SIP-compatible message to the SS7/SIP signaling gateway 16 to request TCAP information to support a given communication, and can receive an SIP-compatible message from the SS7/SIP signaling gateway that comprises a TCAP response to such request. Details of such an exchange are presented below. In a preferred embodiment, and pursuant to another mode of operation, the SIP-compatible device 14 can transmit an SIP-compatible message to, for example, the directory server 15 to request route information to support a communication, and to receive an SIP-compatible message from the directory server 15 comprising a TCAP response to the request for route information. This latter capability permits the SIP-compatible device 14 to avoid instituting an interaction with the SS7 network 11 when the necessary information is already present and available in the SIP network 10 within an appropriate period of time.

Pursuant to another mode of operation in a preferred embodiment, the SIP-compatible device 14 utilizes the first mode of operation described above when the route information request of the second mode of operation described above results in reception of an SIP-compatible message from the directory server 15 indicating that the needed TCAP information is not locally available. In yet another mode of operation, when the SIP-compatible device 14 receives TCAP information as per the first mode of operation described above, the SIP-compatible device 14 causes at least portions of that information (or information that otherwise represents the substantive content of that TCAP information) to be locally stored within the SIP network 10 (by using, for example, the directory server 15).

Figure 2:
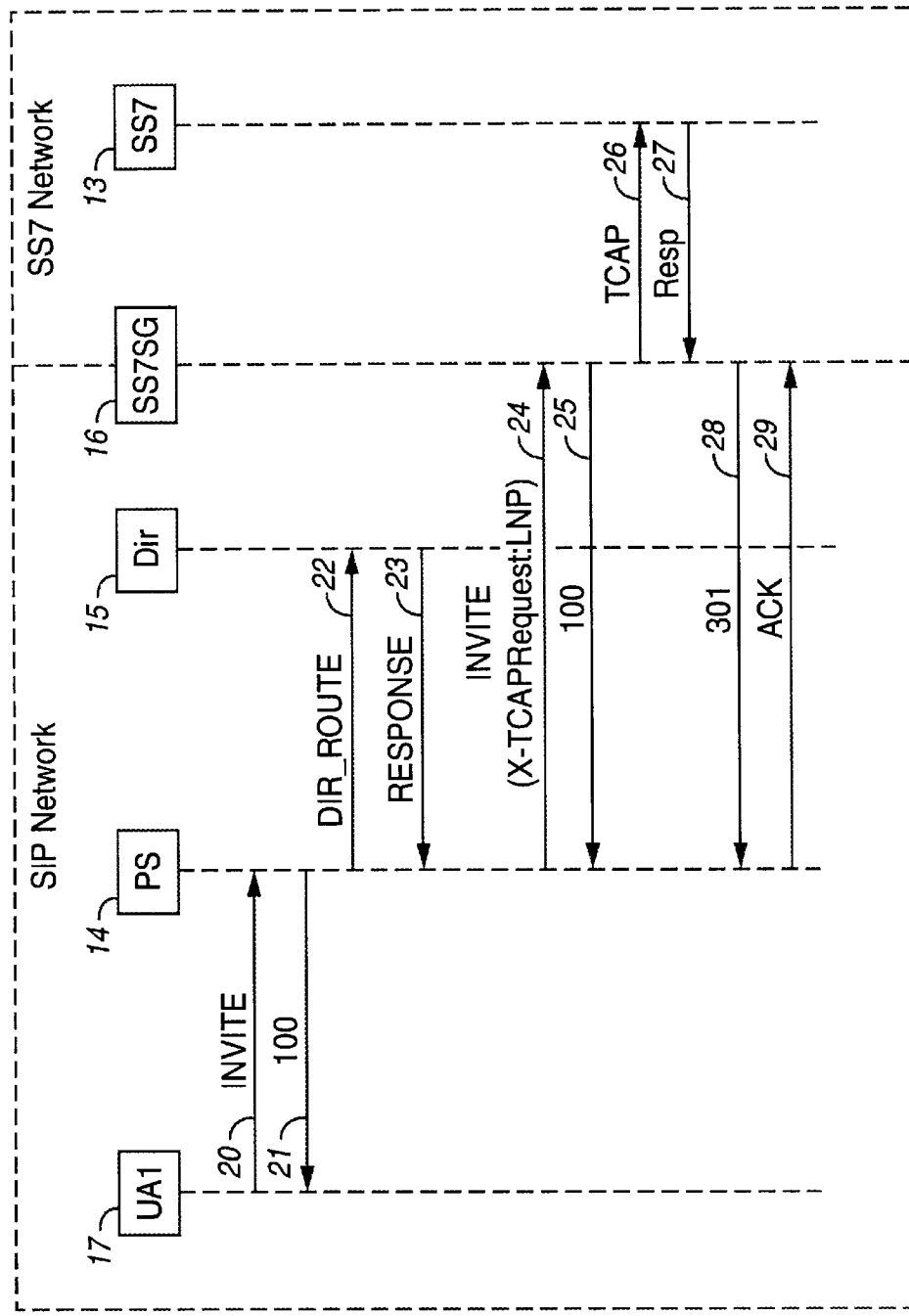
FIG. 2 comprises a timing diagram as configured in accordance with an embodiment of the invention.

So configured, the SIP-compatible device 14 can locate, both locally and externally, routing information (such as TCAP information) as may be useful or necessary to permit establishment or maintenance of a call (including but not limited to various services that usually require one or more TCAP look-ups such as toll-bearing calls, toll-free calls, and local number portability). Referring now to FIG. 2, a more detailed explanation of a particular embodiment will be presented.

In the illustrated example, a user agent 17 (the user agent comprising an SIP device such as an Internet telephone or multimedia device, for example) uses SIP to transmit to an SIP proxy server 14 an INVITE message 20. This INVITE message includes, in this example, a destination number (such as, for example, 555 555—555). The SIP proxy server 14 responds with a "100" message 21 to indicate "trying" in accord with SIP messaging. In this embodiment, the SIP proxy server 14 transmits a DIR_ROUTE message 22 to the directory server 15 to seek identification of a communications route that will correspond with the destination number. When such local routing information is not available, the directory server 15 returns a response 23 to indicate this condition. In a preferred embodiment, this response 23 will further identify a particular SS7/SIP signaling gateway that can likely facilitate locating the desired routing information.

The SIP proxy server 14 then transmits an SIP-compatible message comprising an INVITE message 24 that includes the destination number as before along with a supplemental header. For purposes of this embodiment, this header is referred to as "X-TCAPRequest:XXX" where "XXX" represents a specific TCAP request. For example, "LNP" could be used to request TCAP information that relates to local number portability service for the destination number. In general, such an INVITE message could comprise in its entirety:

INVITE sip:XXX@YYY, user=phone;SIP/Z.Z
TO:XXX@YYY
FROM:VVV@WWW
CALL-ID:RRR
Cseq:1 INVITE
Contact:<AAA>
X-TCAPRequest:DDD Where XXX comprises a destination user agent number, YYY comprises a domain 20 identifier, Z.Z comprises a version number, VVV comprises a source user agent number, WWW comprises a domain identifier, RRR comprises a unique call identifier, AAA comprises a reachable source identifier, and DDD comprises an identifier of a specific request for TCAP information (again, DDD could be "LNP" to represent local number portability, "800" to represent toll-free service, "900" to represent a particular kind of toll-bearing service, and so forth as desired and appropriate to a given application).

The SS7/SIP signaling gateway 16 would then respond with an SIP "100" message 25 to acknowledge receipt of the INVITE message 24. The SS7/SIP signaling gateway 16 would then transmit an SS7 compatible message to the SCP 13 within the SS7 network 11, which message comprises a TCAP request 26 as pertains to the TCAP request that is contained within the INVITE message 24 noted above. For example, if the TCAP request as received from the SIP proxy server 14 were a local number portability lookup, then this request would be made of the SCP 13 via SS7 messaging. The SCP 13 will process the request as it would any other SS7(TCAP) message and return a corresponding response 27 to the SS7/SIP signaling gateway 16. For example, when providing TCAP information comprising local number portability, a redirected target number for the original destination number would be returned to the signaling gateway 16.

The signaling gateway 16 then sources an SIP "301" message 28 to the proxy server 14, which message includes the requested information in the SIP compatible format while the information is translated from the TCAP compatible message, and the proxy server 14 responds with an appropriate SIP acknowledgement message 29.

At this point, pursuant to one embodiment, the proxy server 14 uses the TCAP information to continue processing the new call (using whatever call setup procedure may be appropriate as well understood in the art). As will be illustrated below in more detail, pursuant to another embodiment, the proxy server 14 could also, at this point, aid in facilitating local storage of the TCAP information such that this information will be available for subsequent use in the SIP network 10 without making further inquiry of the SS7 network 11.

Under some circumstances, the TCAP inquiry may return a negative result. That is, there may in fact be no additional routing information required to complete a successful call setup for a given call. For example, a TCAP inquiry can be made with respect to local number portability, and the SCP 13 data may indicate that the destination number provided has not been ported and hence there is no corresponding alternate routing information. Under such conditions, the above described process can nevertheless be readily modified to facilitate expeditious call setup.

Figure 3:
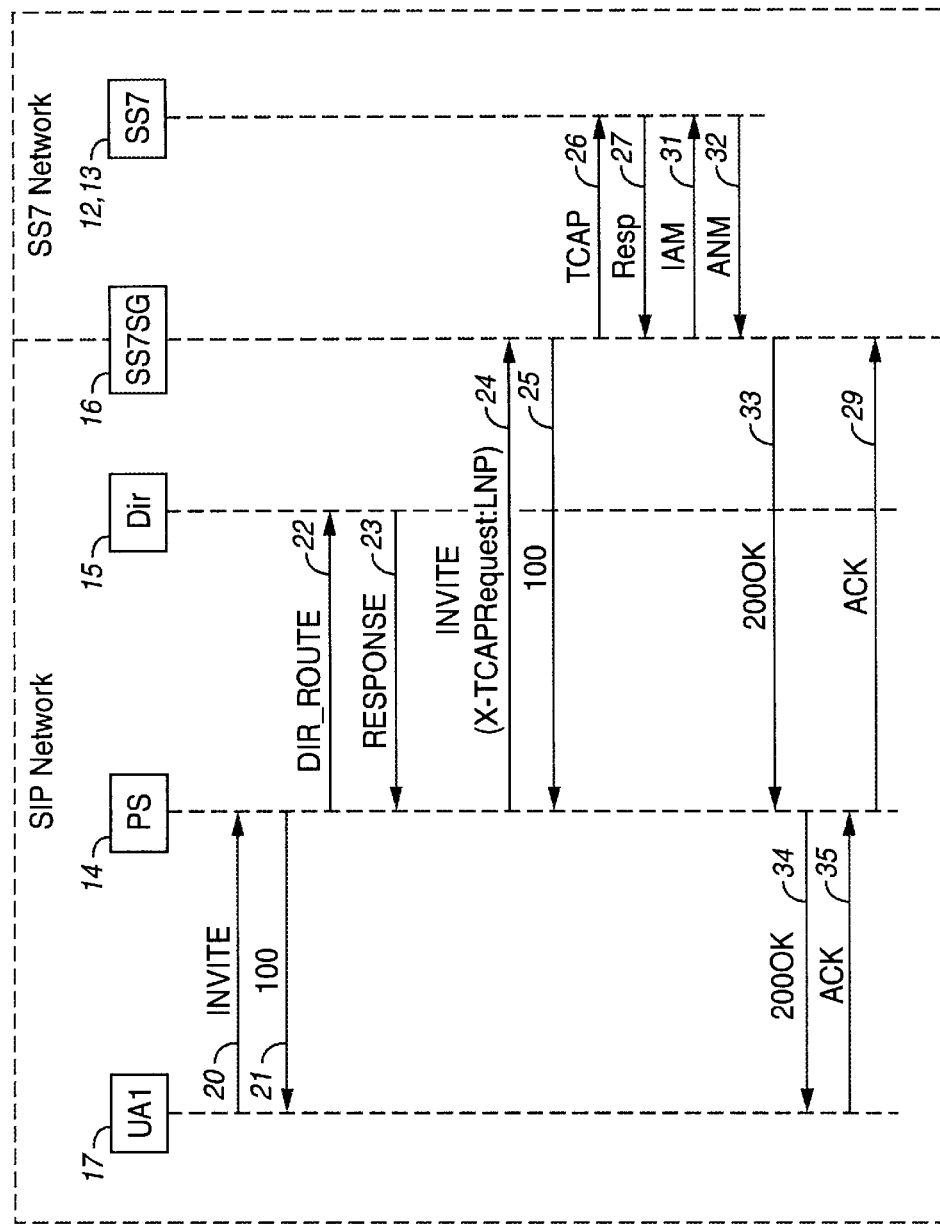
FIG. 3 comprises another timing diagram as configured in accordance with an embodiment of the invention.

For example, with reference to FIG. 3, the process as described above can again proceed up through submission of the SS7 (TCAP) inquiry message 26 to the SCP 13. The negative TCAP result would then be returned in a response 27 from the SCP 13 to the SS7/SIP signaling gateway 16. The signaling gateway 16 can then provide an ISUM IAM message 31 to the PSTN 12 to further the call setup process. Upon receiving the corresponding ANM message 32 from the PSTN 12, normal call setup would continue. In particular, the signaling gateway 16 would provide an SIP "2000K" message to the proxy server 14, which will then forward the message 34 to the originating user agent 17. Acknowledgement messages 35 and 29 will then follow and call setup will be complete.

So configured, an ultimately unnecessary TCAP inquiry to the SS7 network 11 will not substantially delay call setup.

Figure 4:
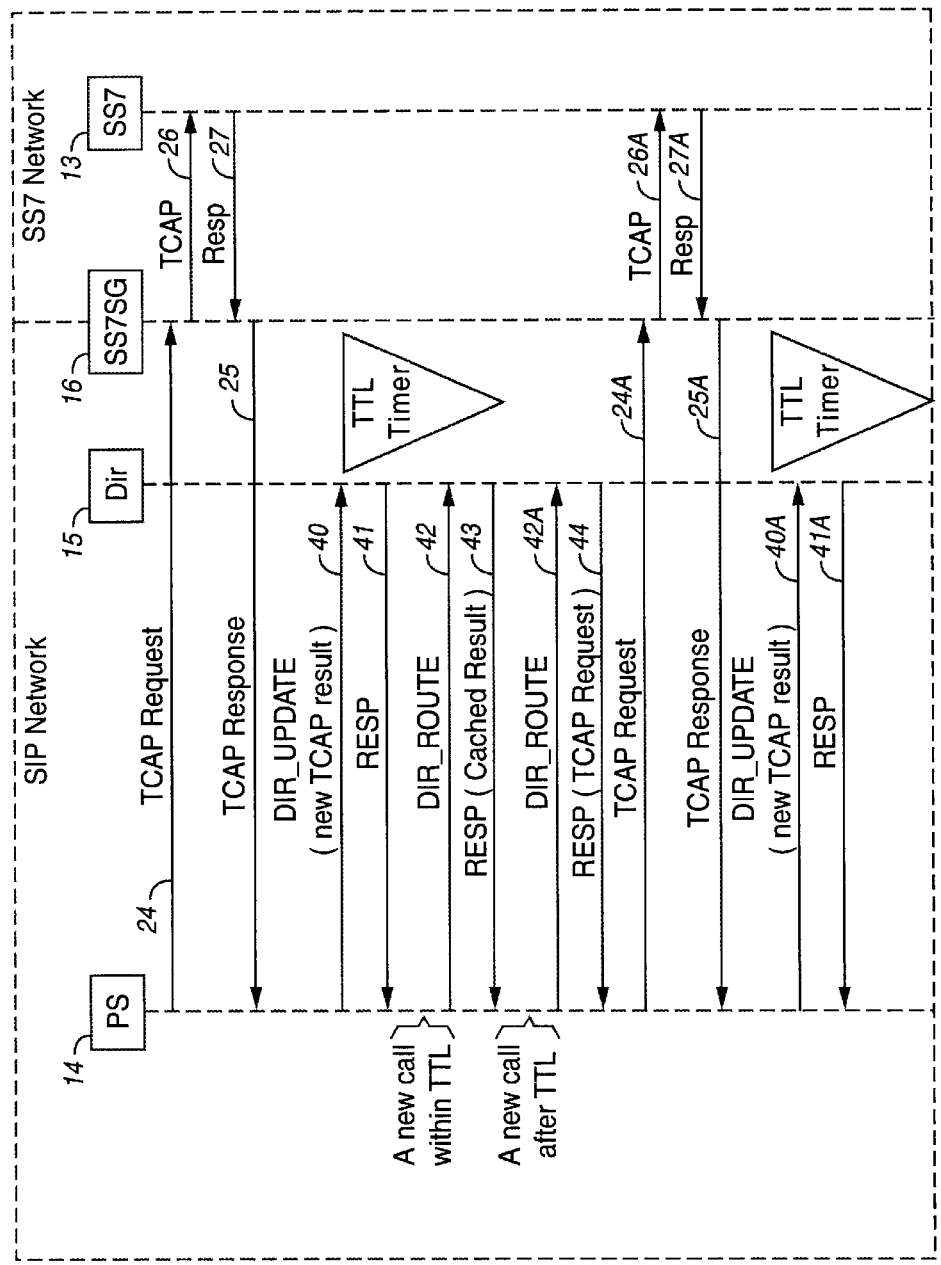
FIG. 4 comprises yet another timing diagram as configured in accordance with an embodiment of the invention.

As already mentioned above, in an alternative embodiment TCAP information as received from the SS7 network 11 can be locally stored, at least for a period of time, in the SIP network 10. FIG. 4 illustrates one embodiment to achieve such an approach. The process as described above would again be repeated until the proxy server 14 receives the TCAP response message 25 (note that for the purpose of clarity, some of the preliminary messages are not depicted in FIG. 4). The proxy server 14 then sources an SIP DIR_UPDATE message 40 to the directory server 15 that includes the route information as received from the TCAP transaction performed in the SS7 network 11, to which the directory server 15 provides an appropriate acknowledgement and response 41.

So configured, if and when the proxy server 14 again queries 42 the directory server 15 (using, for example, an SIP DIR_ROUTE message), the directory server 15 can use the corresponding previously cached TCAP information to form an appropriate routing response 43 to the proxy server 14. This approach of course avoids the need to repeatedly visit the SS7 network 11 for the same information.

If desired, such cached information can be retained for an indefinite term (or, for example, can be stored and deleted on a first-in, first-out basis). For some applications, this approach may be satisfactory. In other settings, however, such an approach may be sub-optimal. Rarely-used TCAP information may unnecessarily supplant frequently used TCAP information, for example. Or an unreasonably large memory and memory access platform may be required to retain a sufficiently useful amount of information.

To at least ameliorate such concerns, and pursuant to yet another embodiment, a timer can be initiated upon caching TCAP information at the directory server 15. For some period of time (the duration being as selected by the system manager), the directory server 15 will retain the TCAP information for subsequent use as described above. Eventually, however, the directory server 15 will purge the stored information. Following such a purge, a subsequent request 42A from the proxy server for corresponding routing information will garner a response 44 from the directory server 15 that a TCAP request is now required. The proxy server 14 will then interact with the SS7/SIP signaling gateway 16 as described above to again receive the desired TCAP information 25A, at which point the proxy server 14 will again direct 40A the directory server 15 to update the local memory to again include the TCAP information. Upon storing this information, as before, the directory server 15 will again reinitiate a corresponding timer and the process will continue as already described.

Pursuant to these various embodiments, various SIP-only entities can acquire necessary TCAP information when needed. Such information can be obtained from an SS7 network, notwithstanding that the originating SIP entity cannot communicate compatibly with SS7 entities. Furthermore, if desired, information so obtained can be locally stored (at least temporarily) to avoid at least some future external lookup activities. These results are attained within the ambit of SIP signaling requirements and can be enabled with little modification to existing entities. As a result, modern SIP networks can be readily used in combination with legacy SS7 infrastructure with relative ease and accommodation.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   within a first network that supports internal use of session initiation protocol (SIP):
   sourcing an SIP-compatible message that includes a request for transaction capabilities application part (TCAP) information;
   forwarding the request in a signaling system 7 (SS7)-compatible message to thereby provide a forwarded request.

2. The method of claim 1 wherein sourcing an SIP-compatible message comprises sourcing the message from an SIP-compatible device.

3. The method of claim 2 wherein sourcing the message from an SIP-compatible device includes sourcing the message from one of an SIP-compatible user agent server, user agent client, proxy server, and redirect server.

4. The method of claim 2 and further comprising receiving at the SIP-compatible device an SIP INVITE message from an SIP-compatible user agent, and wherein sourcing an SIP-compatible message further comprises using the SIP INVITE message to form the request for TCAP information.

5. The method of claim 4 wherein receiving at the SIP-compatible device an SIP INVITE message from an SIP-compatible user agent includes receiving at the SIP-compatible device an SIP INVITE message from an Internet Protocol (IP) device.

6. The method of claim 5 wherein receiving at the SIP-compatible device an SIP INVITE message from an Internet Protocol (IP) device includes receiving at the SIP-compatible device an SIP INVITE message from an Internet Protocol (IP) device comprising one of a user agent server, a user agent client, and a proxy server.

7. The method of claim 5 wherein sourcing an SIP-compatible message that includes a request for transaction capabilities application part (TCAP) information includes sourcing a message that comprises, at least in part, the following content:
   INVITE sip:XXX@YYY, user=phone;SIP/Z.Z
   TO: <XXX@YYY>
   FROM: <VVV@WWW>
   CALL-ID: RRR
   CSeq: 1 INVITE
   Contact: <AAA>
   X-TCAPRequest: DDD
   wherein:
   XXX comprises a destination telephone number;
   YYY comprises a domain identifier;
   Z.Z comprises a version number;

VVV comprises a source telephone number;
WWW comprises a domain identifier;
RRR comprises a unique call identifier;
AAA comprises a reachable source identifier;
DDD comprises an identifier of a specific request for TCAP information.

8. The method of claim 1 and further comprising:
receiving an SS7-compatible message comprising a response to the forwarded request.

9. The method of claim 8 and further comprising:
using the response to setup a communication link.

10. The method of claim 9 wherein using the response to setup a communication link includes setting up a call.

11. The method of claim 10 wherein using the response to setup a communication link includes setting up one of a multimedia call and a telephone call.

12. The method of claim 10 wherein setting up a call includes setting up a call between an SIP-compatible user agent and a non-SIP-compatible user agent.

13. The method of claim 9 wherein setting up a call includes using a local number portability feature.

14. The method of claim 9 wherein setting up a telephone call includes setting up a toll-free telephone call.

15. The method of claim 9 wherein setting up a telephone call includes setting up a toll-bearing telephone call.

16. The method of claim 8 and further comprising:
storing at least a portion of the response.

17. The method of claim 16 wherein storing at least a portion of the response includes only storing at least a portion of the response for a predetermined period of time.

18. The method of claim 17 wherein storing at least a portion of the response for a predetermined period of time includes determining the predetermined period of time as a function of a service that corresponds to the response.

19. The method of claim 17 and further comprising:
subsequent to the predetermined period of time, automatically providing an inquiry message in an SIP-compatible message to obtain information as relates to the response.

20. The method of claim 19 and further comprising:
forwarding the inquiry message in an SS7-compatible message to thereby provide a forwarded inquiry message.

21. The method of claim 20 and further comprising:
receiving an SS7-compatible message comprising an inquiry response to the forwarded inquiry message.

22. The method of claim 21 and further comprising:
storing at least a portion of the inquiry response to provide a stored inquiry response.

23. The method of claim 22 and further comprising:
using the stored inquiry response to facilitate setting up a telephone call.

24. The method of claim 20 and further comprising:
receiving a response to the forwarded request that comprises an indication that no additional information is necessary to facilitate setting up a telephone call;
setting up the telephone call.

25. A method comprising:
at a first session initiation protocol (SIP)-compatible network element that comprises a part of an SIP network;
forming an inquiry regarding route determination to support a communication using the SIP network;
transmitting the inquiry to a directory server that comprises a part of the SIP network;
receiving a response from the directory server that indicates a need for transaction capabilities application part (TCAP) information to facilitate determination of the route;
forming an SIP-compatible message that includes a request regarding the TCAP information;
transmitting the SIP-compatible message with the request regarding the TCAP information to a signaling gateway;
receiving from the signaling gateway an SIP-compatible message comprising a TCAP response that contains one of:
routing information to support the communication; and
a call setup response to support the communication.

26. The method of claim 25 wherein the first session initiation protocol (SIP)-compatible network element comprises one of a proxy server, a user agent server, a user agent client, and a redirect server.

27. The method of claim 25 and further comprising:
receiving, from a second SIP-compatible network element, an INVITE message that includes a destination address;
using the destination address to form the inquiry regarding route destination.

28. The method of claim 25 wherein transmitting the SIP-compatible message with the request regarding the TCAP information to a signaling gateway includes transmitting the SIP-compatible message with the request regarding the TCAP information to a signaling gateway that provides a gateway between the SIP network and a signaling system 7 (SS7) network.

29. The method of claim 25 wherein receiving routing information that is based, at least in part, upon the TCAP response includes using the routing information to facilitate setting up a communication between a user agent and a desired communication target that correlates to the routing information.

30. The method of claim 25 wherein receiving routing information to support the communication further includes forwarding at least part of the routing information to another network element for at least temporary storage.

31. The method of claim 30 wherein the another network element comprises an SIP directory.

32. A session initiation protocol (SIP)-based network element having an interface to operably couple to a plurality of other SIP-based network elements including a signaling system 7 (SS7)/SIP signaling gateway, wherein the SIP-based network element has at least a first and second mode of operation, wherein:
pursuant to the first mode of operation the SIP-based network element:
transmits an SIP-compatible message to the SS7/SIP signaling gateway to request transaction capabilities application part (TCAP) information to support a communication; and
receives an SIP-compatible message from the SS7/SIP signaling gateway comprising a TCAP response to the request; and
pursuant to the second mode of operation the SIP-based network element:
transmits an SIP-compatible message to another SIP-based network element to request route information to support a communication;
receives an SIP-compatible message from the another SIP-based network element comprising a TCAP response to the request for route information.

33. The SIP-based network element of claim 29 wherein pursuant to the first mode of operation the SIP-based network element further:
transmits an SIP-compatible message to another SIP-based network element to request route information to support a communication;

receives an SIP-compatible message from the another SIP-based network element indicating a need for TCAP information that is not locally available.

34. The SIP-based network element of claim 33 wherein pursuant to the first mode of operation the SIP-based network element further:
- transmits at least a portion of the TCAP response to the request to another SIP-based network element for at least temporary storage.

35. The SIP-based network element of claim 34 wherein pursuant to the second mode of operation the TCAP response is based, at least in part, upon a TCAP response as was previously transmitted to the another SIP-based network element and stored at the another SIP-based network element.

* * * * *